(12) United States Patent
Ramirez et al.

(10) Patent No.: US 12,206,981 B2
(45) Date of Patent: Jan. 21, 2025

(54) POWER SEQUENCING AND LOW POWER PROCESSOR WITH MULTIPLE BOOT PROCESSES

(71) Applicant: GoPro, Inc., San Mateo, CA (US)

(72) Inventors: Michael A. Ramirez, Mountain View, CA (US); Kejen Shen, Fremont, CA (US); Kenneth Lee, Hayward, CA (US)

(73) Assignee: GoPro, Inc., San Mateo, CA (US)

( * ) Notice: Subject to any disclaimer, the term of this patent is extended or adjusted under 35 U.S.C. 154(b) by 160 days.

(21) Appl. No.: 18/085,766

(22) Filed: Dec. 21, 2022

(65) Prior Publication Data
US 2023/0276123 A1    Aug. 31, 2023

Related U.S. Application Data

(60) Provisional application No. 63/314,720, filed on Feb. 28, 2022.

(51) Int. Cl.
| | | |
|---|---|---|
| *H04N 23/65* | (2023.01) | |
| *G06F 1/3296* | (2019.01) | |
| *G08B 5/36* | (2006.01) | |
| *G06F 9/4401* | (2018.01) | |

(52) U.S. Cl.
CPC ......... *H04N 23/651* (2023.01); *G06F 1/3296* (2013.01); *G08B 5/36* (2013.01); *G06F 9/4403* (2013.01)

(58) Field of Classification Search
None
See application file for complete search history.

(56) References Cited

U.S. PATENT DOCUMENTS

| | | | |
|---|---|---|---|
| 9,444,456 B2* | 9/2016 | Robertson | G06F 1/3203 |
| 2010/0271508 A1* | 10/2010 | Niizato | H04N 23/65 |
| | | | 348/372 |
| 2016/0088223 A1* | 3/2016 | Okazaki | H04N 23/663 |
| | | | 348/372 |

* cited by examiner

*Primary Examiner* — Cynthia Segura
(74) *Attorney, Agent, or Firm* — Young Basile Hanlon & MacFarlane, P.C.

(57) ABSTRACT

Described is an image capture device which provides substantially immediate indications to a user that an image capture device is on after the user has turned on the image capture device. The image capture device can include a processor and a low power processor. The low power processor can perform or initiate multiple substantially parallel processes upon detection of an image capture device power on event. In some implementations, the low power processor can initiate a boot-up process for the processor and a light emitting device (LED) power on process for a LED indicator. In some implementations, the low power processor can initiate a boot-up process for the processor, a LED power on process for a LED indicator, and a battery authentication process for a battery inserted in the image capture device.

20 Claims, 17 Drawing Sheets

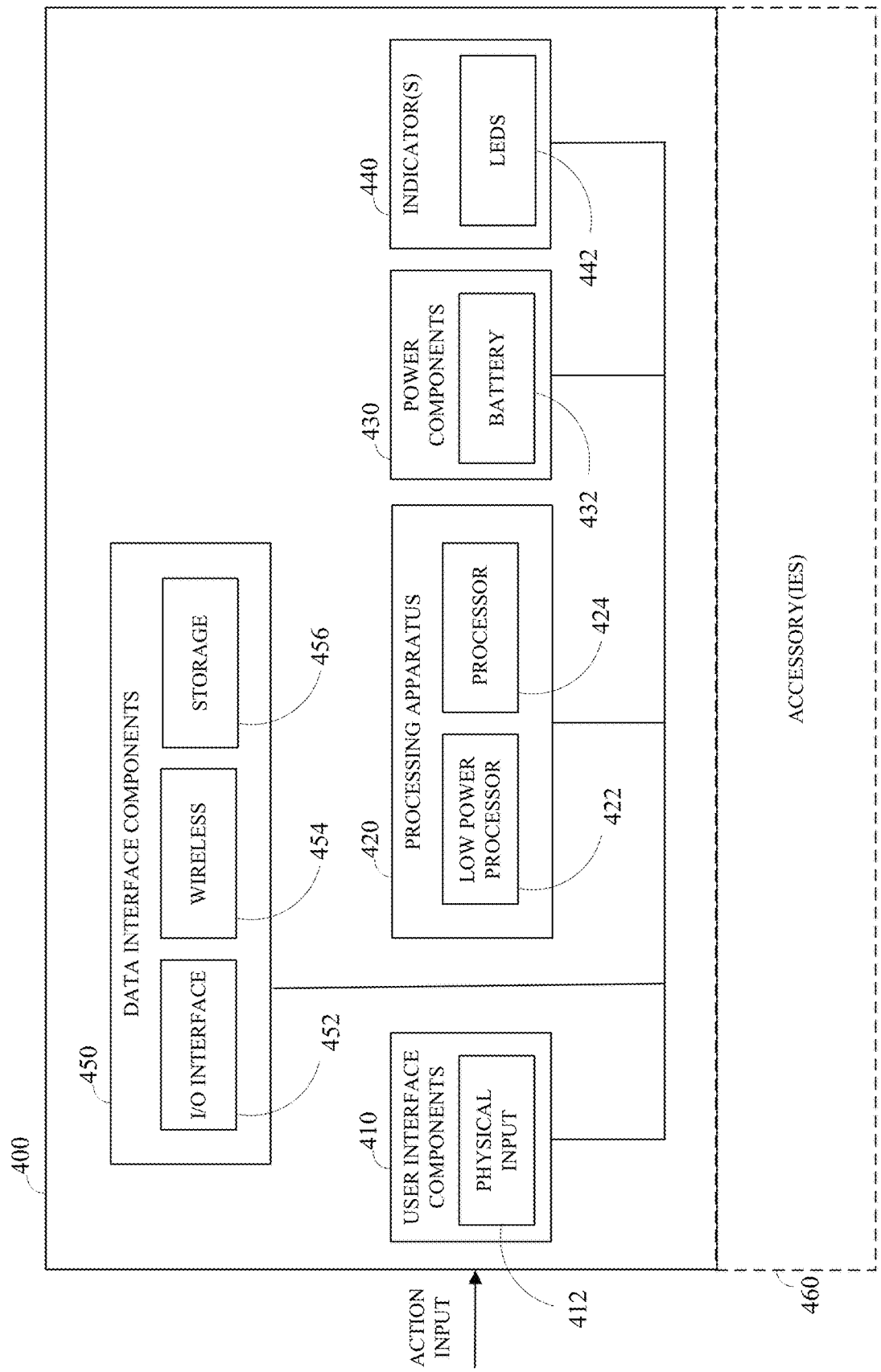

POWER SEQUENCING AND LOW POWER PROCESSOR WITH MULTIPLE BOOT PROCESSES

CROSS-REFERENCE TO RELATED APPLICATIONS

This application claims priority to and the benefit of U.S. Provisional Patent Application No. 63/314,720, filed Feb. 28, 2022, the entire disclosure of which is incorporated by reference herein.

TECHNICAL FIELD

This disclosure relates to power sequencing and power on processing.

BACKGROUND

There can be delays between when an image capture device is powered on in response to a power on event or activity (collectively "event") and when it is operational for a task related to the event. For example, there can be a perceptible delay between when a user turns on an image capture device and receives an indicator that the image capture device is powering on. This can result in the user turning on and off the image capture device multiple times due to the lack of the timely indicator. Moreover, power on and off sequencing can affect operability and cause delays when powering on of the image capture device.

SUMMARY

Disclosed herein are implementations of power sequencing and multiple boot processes initiated by a low power processor in an image capture device upon detection of an image capture device power on event.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a block diagram of an image capture device.

DETAILED DESCRIPTION

The implementations disclosed herein mitigate delays in powering on an image capture device in performance of tasks associated with image capture device power on event. The image capture device can include a processor and a low power processor. The low power processor can perform or initiate multiple substantially parallel processes or tasks upon detection of the image capture device power on event. The term substantially referring to near or almost identical starting times for the tasks. In some implementations, the low power processor can initiate a boot-up process for the processor and a light emitting device (LED) power on process for a LED indicator. This can provide substantially immediate indications to a user that an image capture device is on after the user has turned on the image capture device. In some implementations, the low power processor can initiate a boot-up process for the processor, a LED power on process for a LED indicator, a battery authentication process for a battery inserted in the image capture device, or a combination of other tasks related to the image capture device power on event.

The implementations disclosed herein mitigate issues and delays due to power sequencing of the image capture device with an image capture device power on event. The image capture device can include a primary power management component and at least one secondary power management component. The primary power management component can control signaling and powering on of the at least one secondary power management component via a power management enable logic. The primary power management component can provide a power on or enable control signal and a power off or disable control signal. The power management enable logic can process the power enable signal and/or the power off or disable control signal to provide a secondary power control signal to a secondary power management component. That is, one power control signal is used for power on sequencing and power off sequencing of the secondary power management component in contrast to using two power control signals at the secondary power management component. The secondary power control signal is connected to one input pin at the secondary power management component, which controls both power on sequencing and power off sequencing. A sleep pin in the secondary power management component can be tied to high so that power sequencing of the secondary power management component is controlled via the secondary power control signal. This can provide substantially synchronous power sequencing between the primary power management component and the secondary power management component. The primary power management component and the secondary power management component can then power sequence or power on/off the low power processor, processor, and other components, as applicable and appropriate.

Figure 1A:
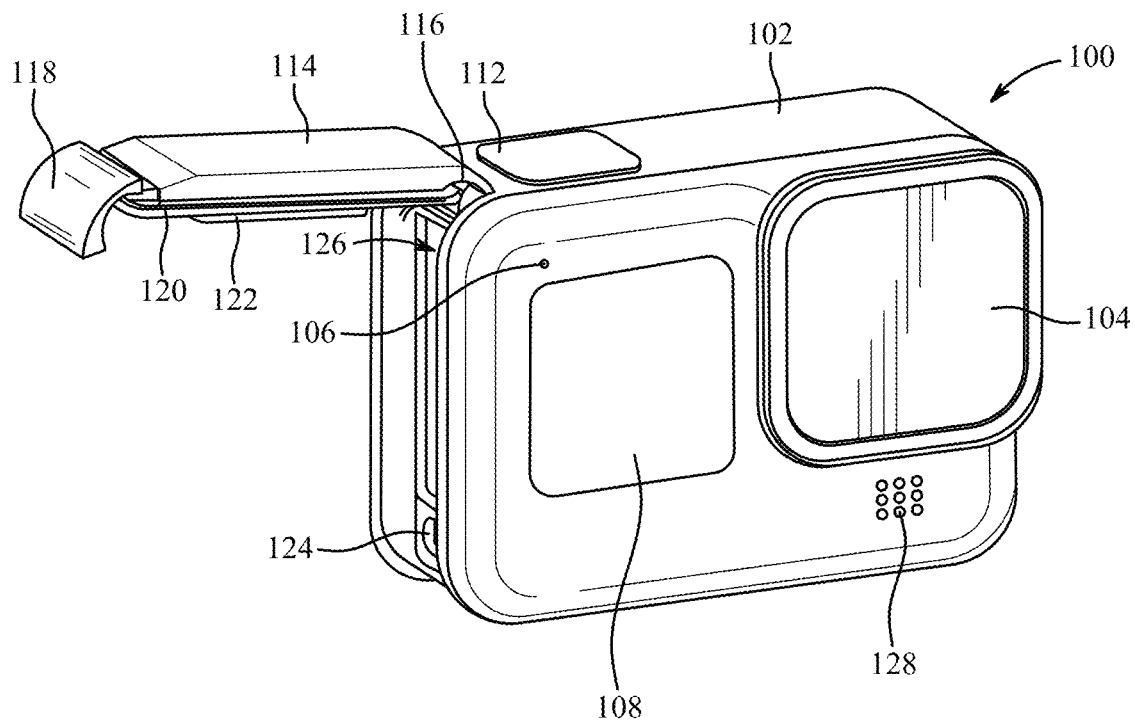
FIGS. 1A-B are isometric views of an example of an image capture device.
Figure 1B:
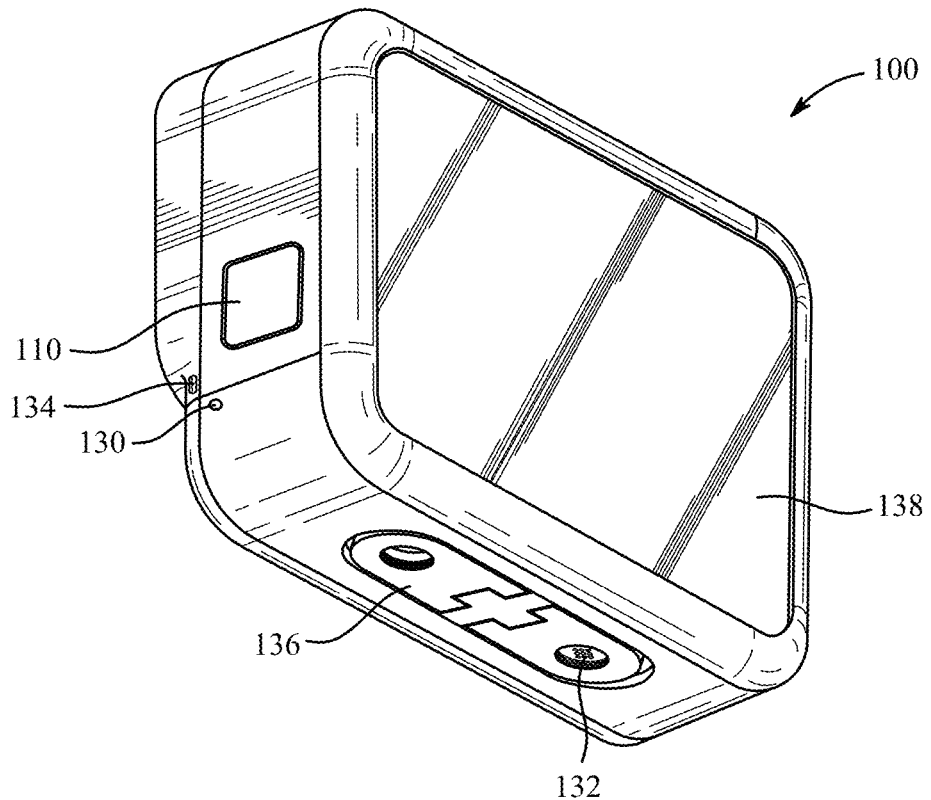

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figures 5A, 5B:
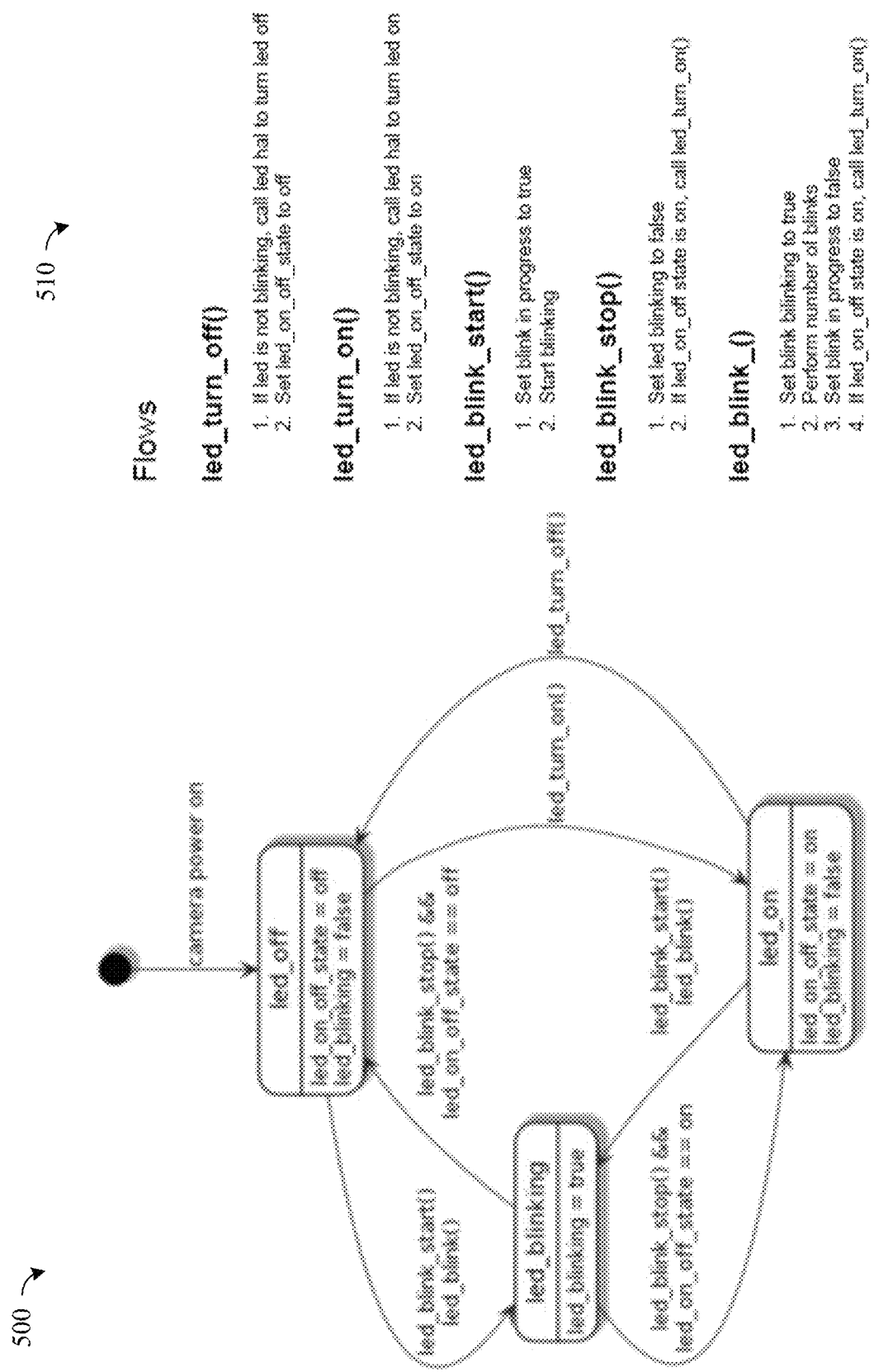
FIG. 5A is a state diagram for a LED indicator.
FIG. 5B are flows related to the state diagram of the LED indicator.
Figure 6:
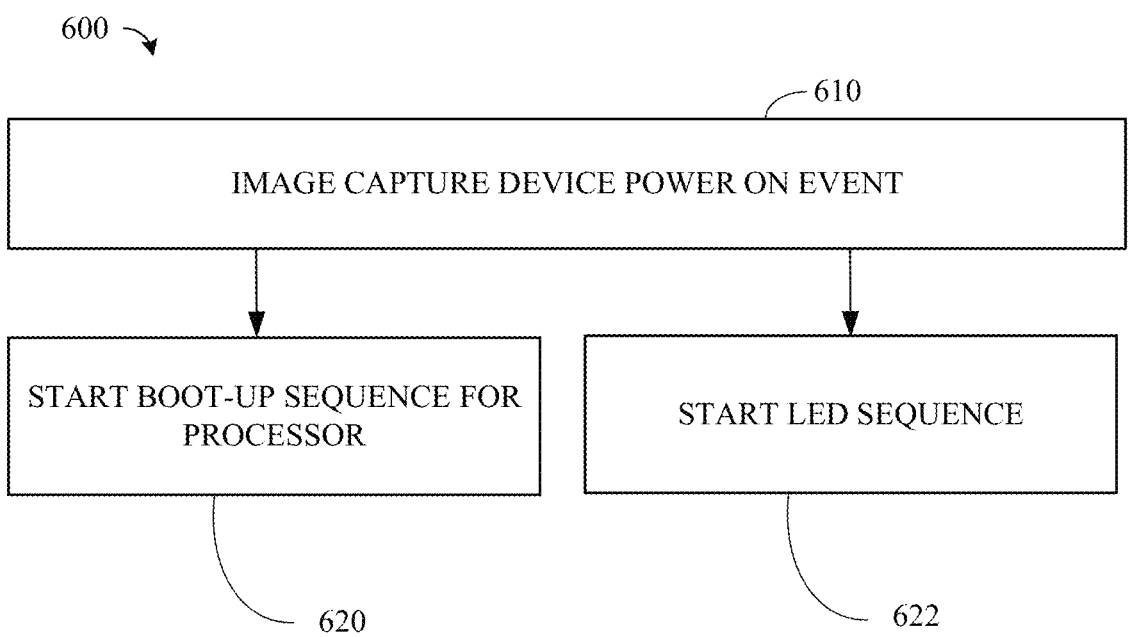
FIG. 6 is a flow chart of a technique to perform multiple boot processes.
Figure 7:
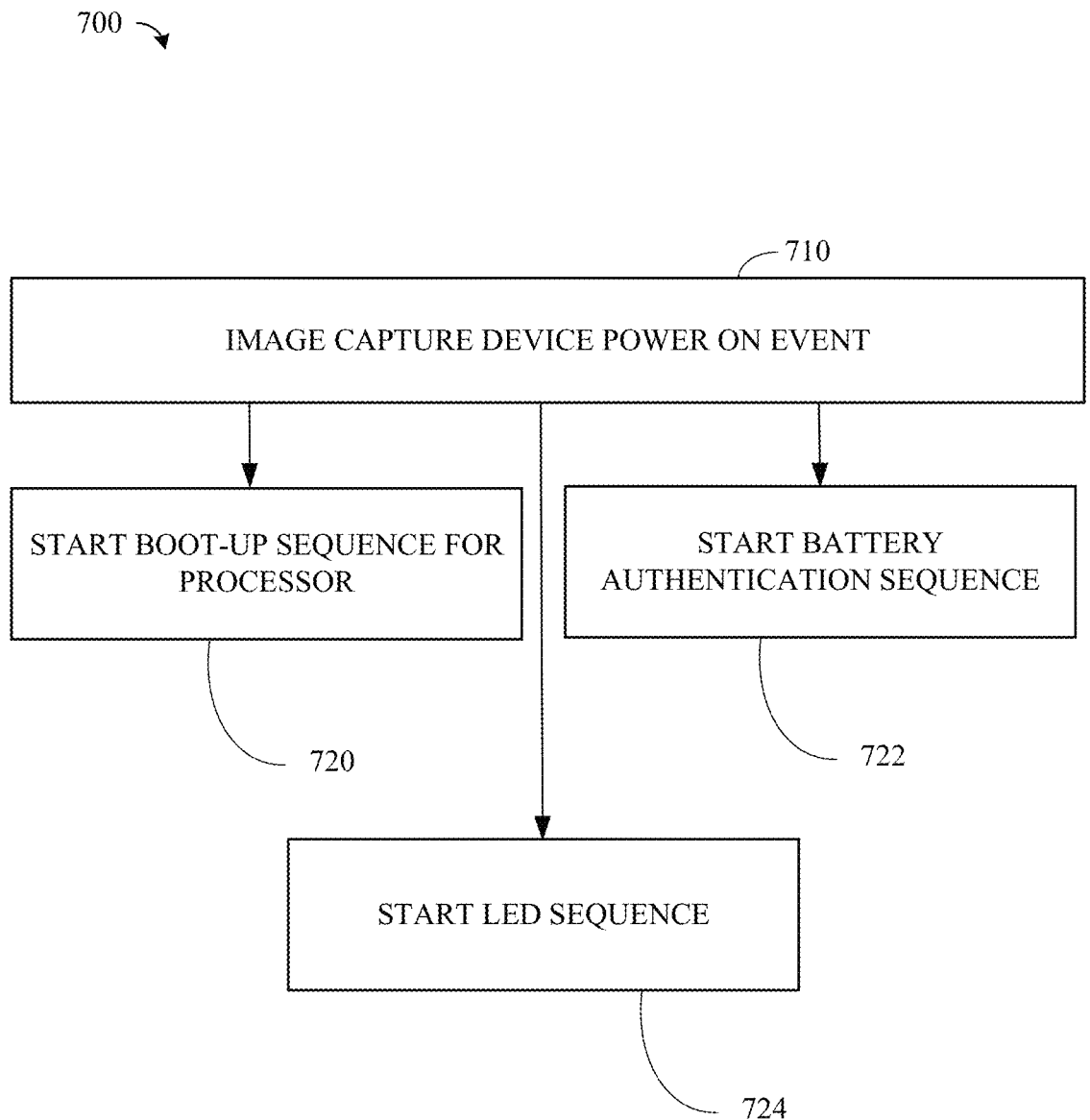
FIG. 7 is another flow chart of a technique to perform multiple boot processes.
Figure 13:
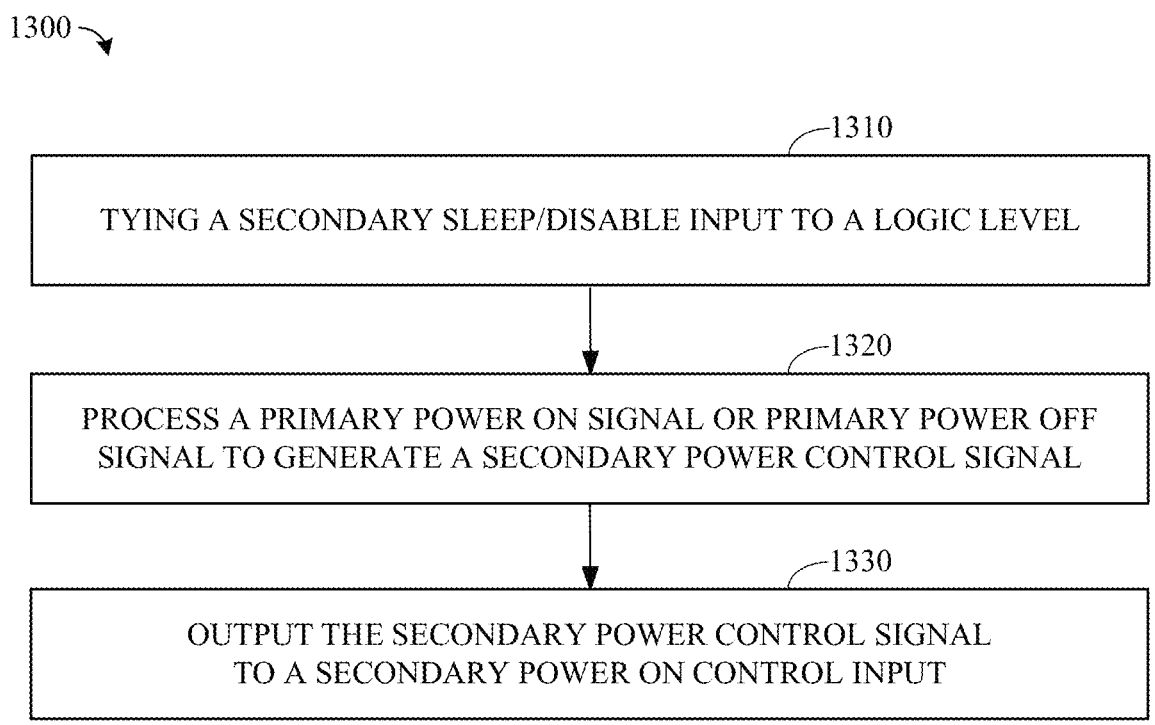
FIG. 13 is a flow chart of a technique to perform power sequencing.
Figure 14:
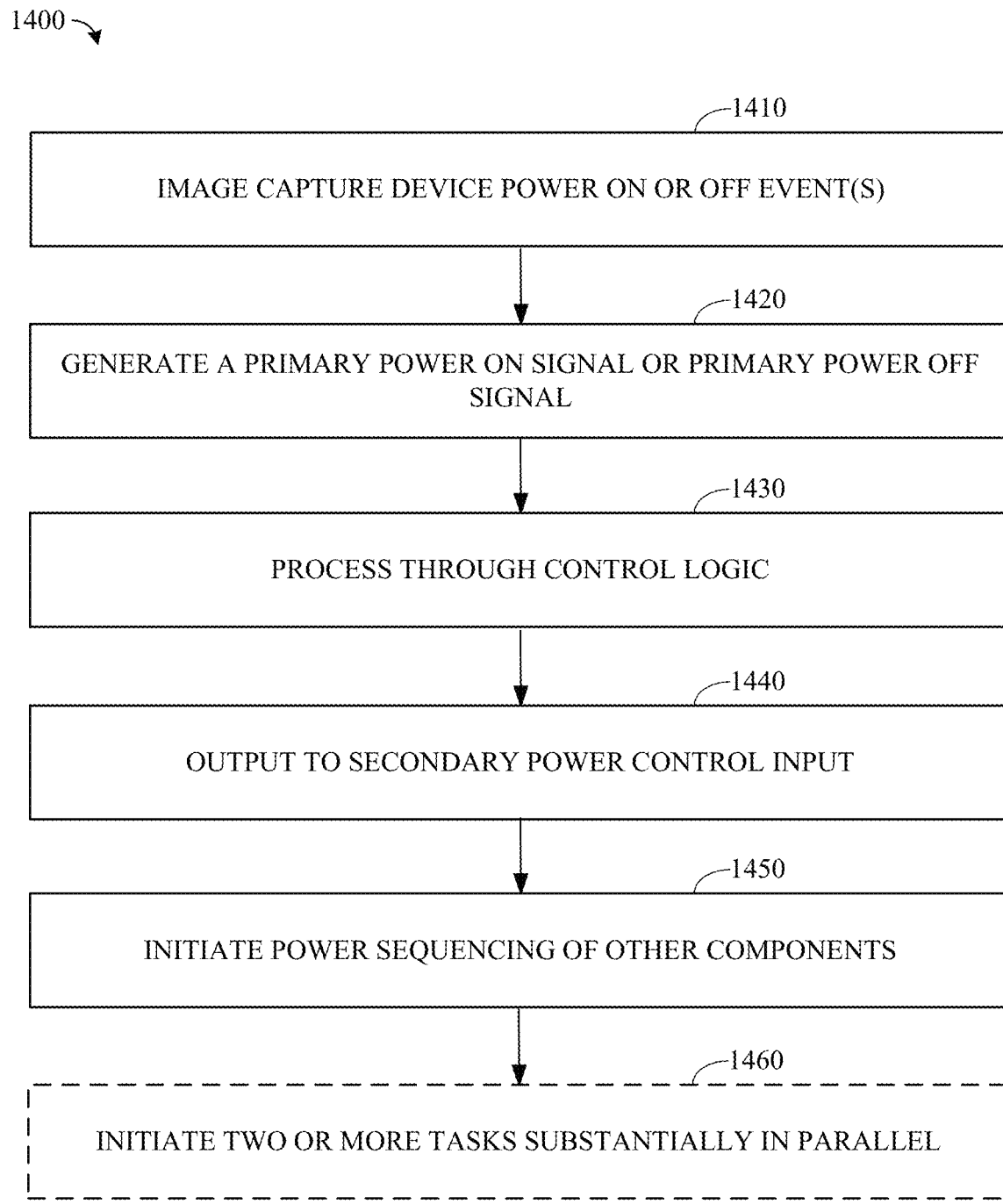
FIG. 14 is a flow chart of a technique to perform powering on of an image capture device.

The image capture device 100 may be used to implement some or all of the techniques described in this disclosure, such as the technique 500 described in FIG. 5A, the technique 510 described in FIG. 5B, the technique 600 described in FIG. 6, the technique 700 described in FIG. 7, the technique 1300 described in FIG. 13, and the technique 1400 described in FIG. 14.

Figure 2A:
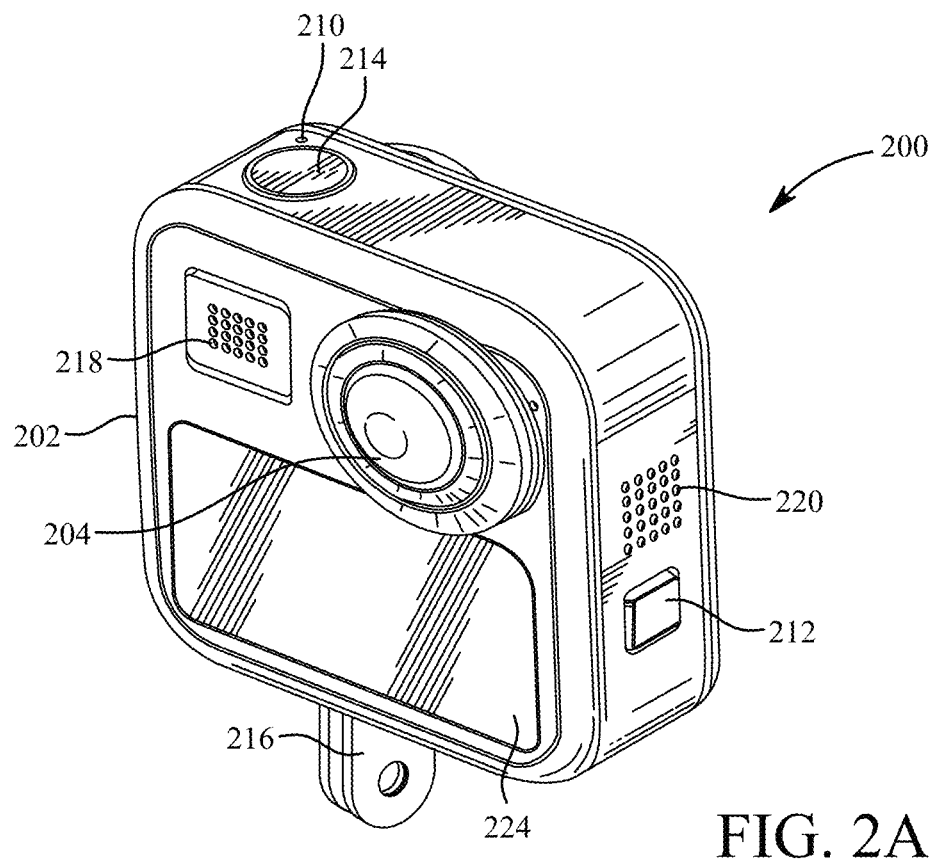
FIGS. 2A-B are isometric views of another example of an image capture device.
Figure 2B:
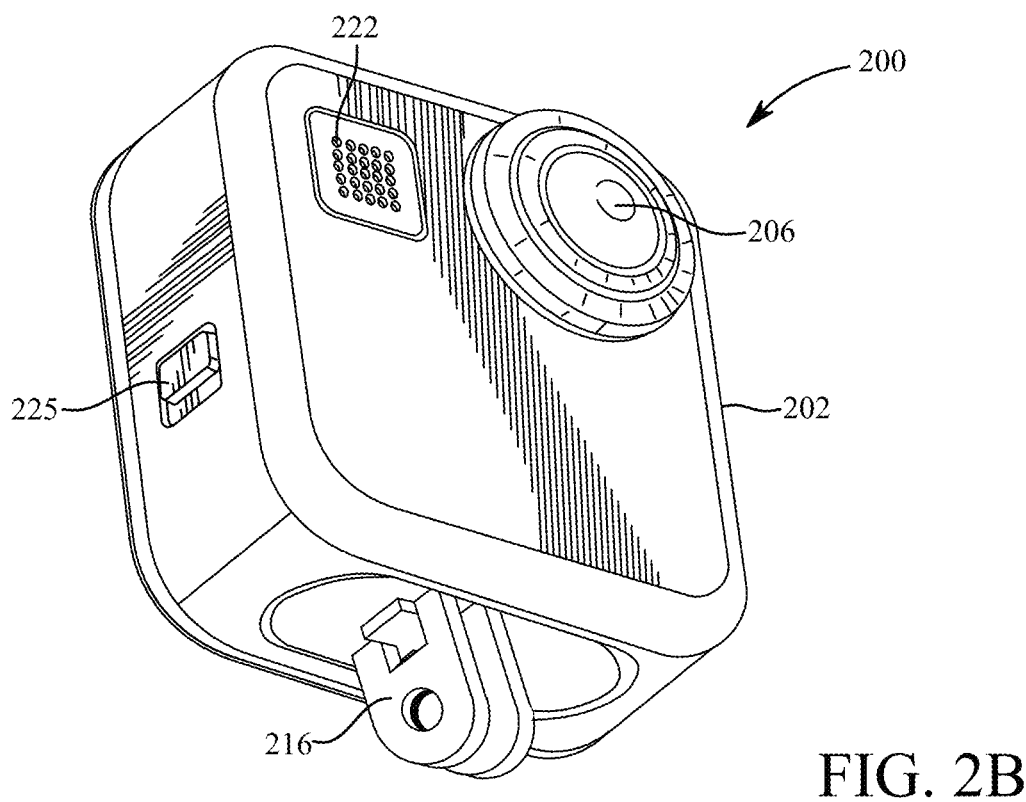

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
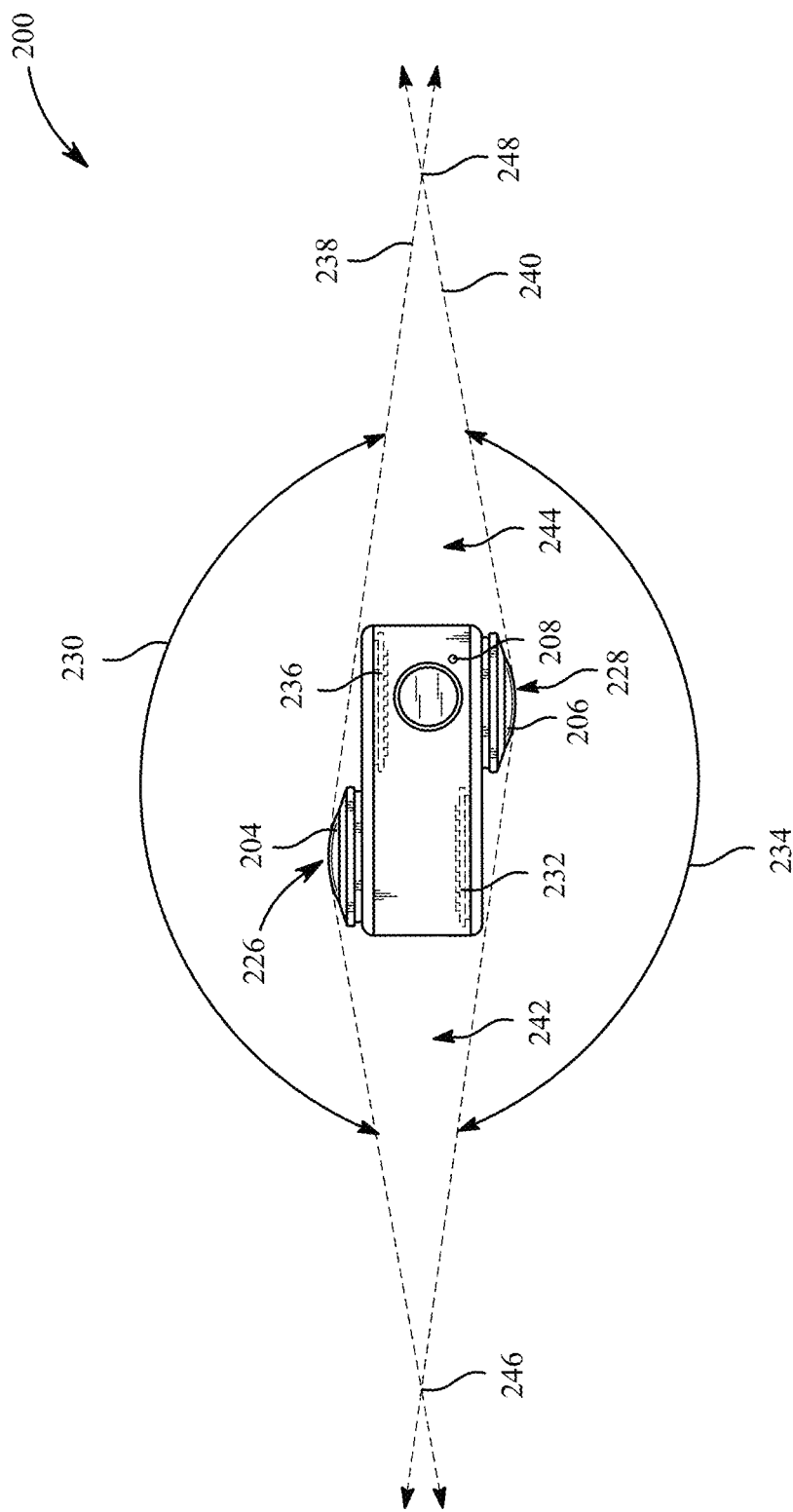
FIG. 2C is a top view of the image capture device of FIGS. 2A-B.
Figure 2D:
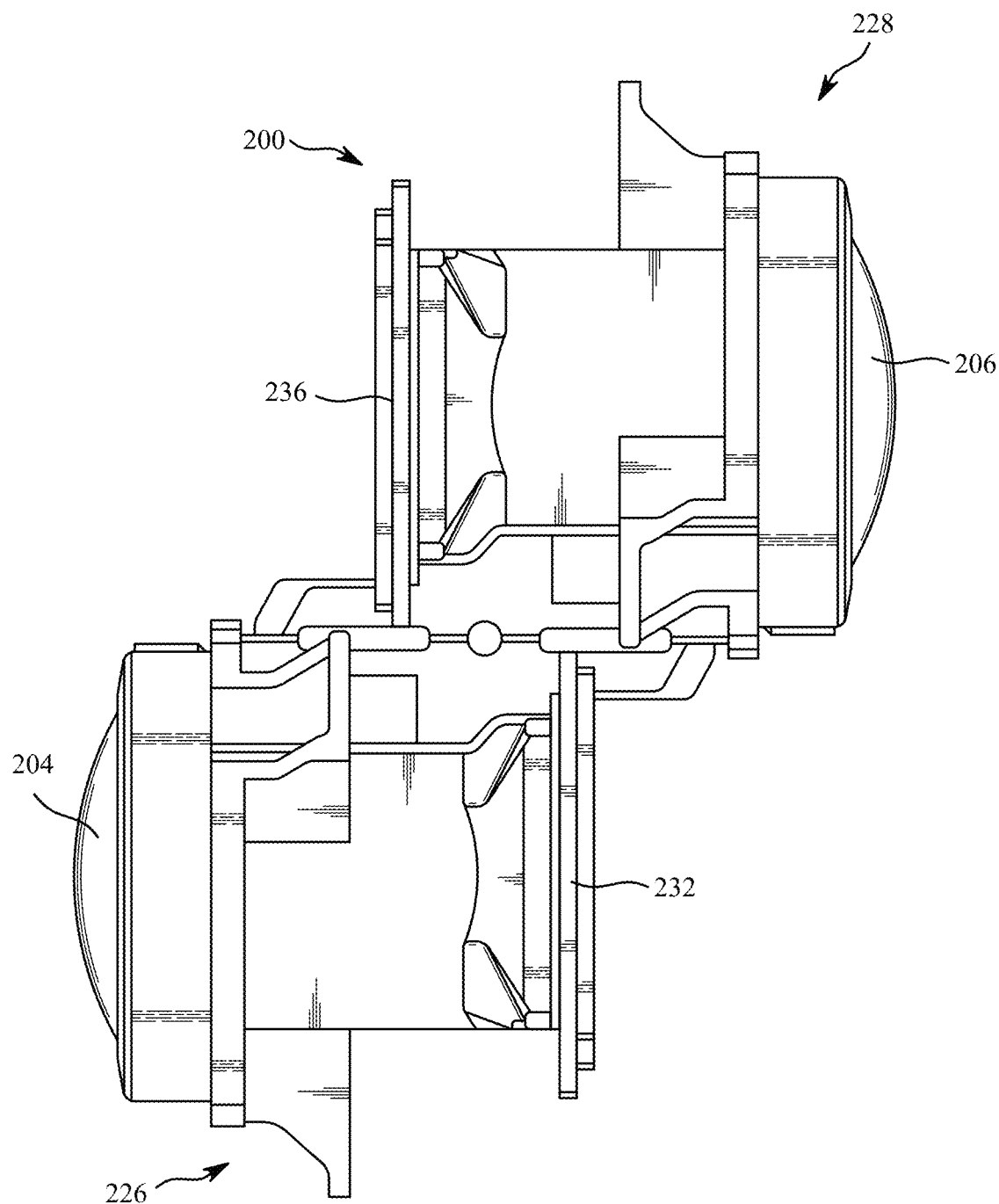
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 500 described in FIG. 5A, the technique 510 described in FIG. 5B, the technique 600 described in FIG. 6, the technique 700 described in FIG. 7, the technique 1300 described in FIG. 13, and the technique 1400 described in FIG. 14.

Figure 3:
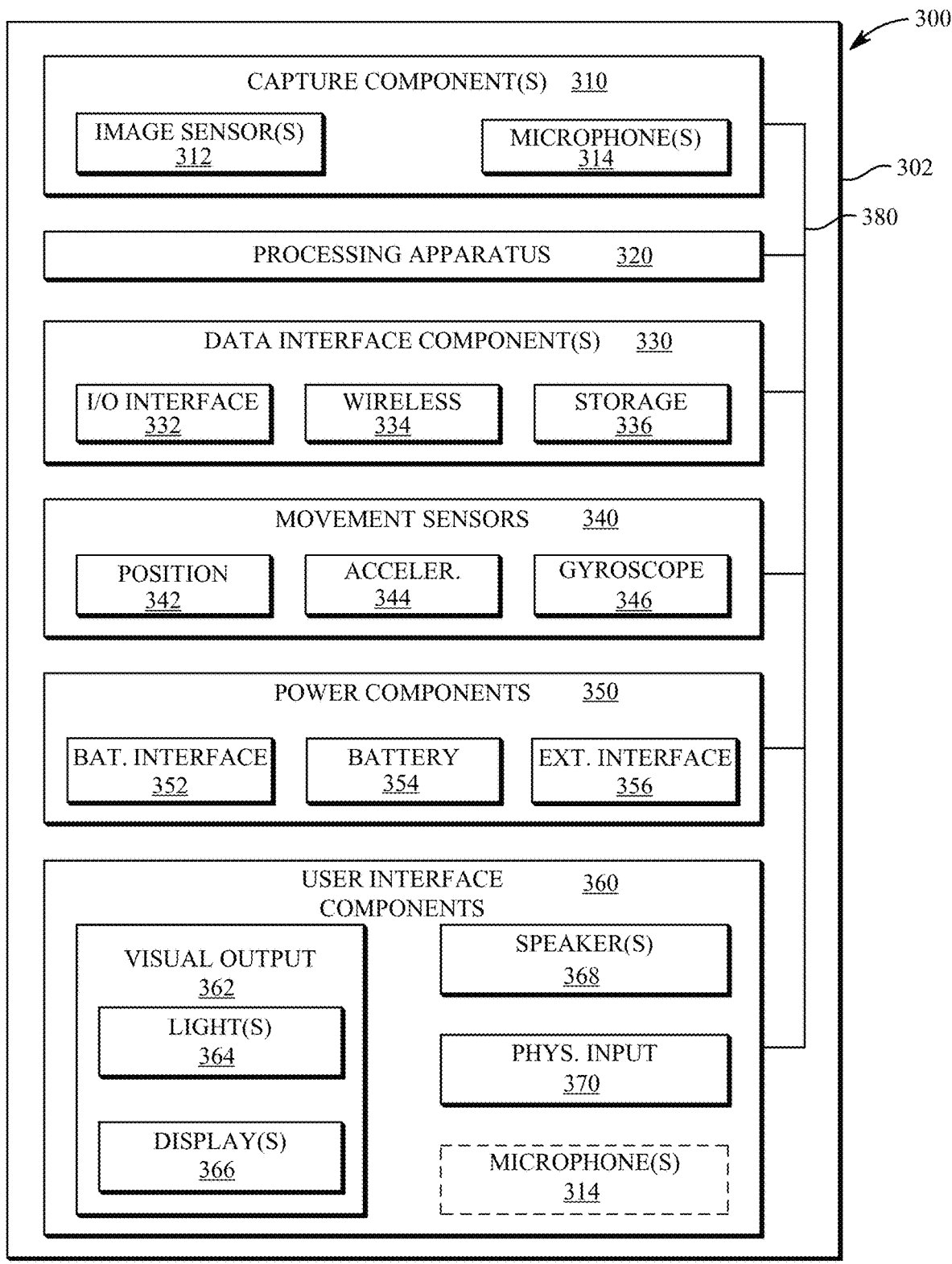
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 500 described in FIG. 5A, the technique 510 described in FIG. 5B, the technique 600 described in FIG. 6, the technique 700 described in FIG. 7, the technique 1300 described in FIG. 13, and the technique 1400 described in FIG. 14.

FIG. 4 is a block diagram of an image capture device 400. The image capture device 400 can be a single-lens image capture device, a multi-lens image capture device, the image capture device 100 of FIGA. 1A-B, the image capture device 200 of FIGS. 2A-D, the image capture device 300 of FIG. 3, or combinations thereof. The description of the image capture device 400 is also applicable to the image capture device 100 of FIGA. 1A-B, the image capture device 200 of FIGS. 2A-D, and the image capture device 300 of FIG. 3.

The image capture device 400 includes user interface components 410, processing apparatus 420, power components 430, indicators 440, and data interface components 450. The user interface components 410 include physical inputs 412 for receiving input actions of a user such as powering on or powering off the image capture device 400. For example, this can be done using a mode button, a shutter button, or like buttons or interfaces. The power components 430 includes a battery 432 configured to provide power for the image capture device 400. The indicators 440 include LEDS 442 configured to convey information to the user such as, but not limited to, that the image capture device 400 is powered on, is processing, or combinations thereof. The data interface components 450 include, for example, I/O interfaces 452, wireless interfaces 454, and storage interfaces 456 such as the I/O interface 332, the wireless data interface 334, and the storage interface 336.

The processing apparatus 420 includes a processor 424 configured to control and operate functionality of the image capture device 400 and a low power processor 422 configured to control and operate other functionality of the image capture device 400 including, but not limited to, substantially performing tasks in parallel in response to an image capture device power on event. For example, the image capture device power on event can include, but is not limited to, a user initiated powering on of the image capture device 400 via the user interface components 410 and the physical inputs 412, insertion of the battery 432 in the image capture device 400, insertion of a memory card in the storage interfaces 456, activation of the image capture device 400 via a mobile application, activation of the image capture device 400 via Bluetooth® using the wireless data interface 33, a programmed wake-up timer, cloud back-up initiated based on a charge level of the battery 432, other like actions, or combinations thereof. The low power processor 422 can perform, substantially in parallel, tasks associated the image capture device power on event, including but not limited to, initiating a boot-up process for the processor 424, turning on the LEDS 442, initiating a battery authentication process for the battery 432 when the battery 432 is inserted in the image capture device 400, initiating memory card processing when a memory card is inserted in the image capture device 400, initiating cloud backup processing (but not performing the cloud backup processing which is performed by the processor 424, for example), wireless processing, and other low power processor 422 control and operational tasks. In some implementations, a remaining set of tasks associated with the image capture device power on event can be performed during or after completion of a boot-up process or sequence of the processor 424.

In some implementations, one or more accessories 460 are releasably attached to the image capture device 400 prior to the image capture device power on event. The one or more accessories 450 can be, but is not limited to, an external adaptor for audio, a media accessory, a handheld adaptor for remote control of the image capture device 400, a charging cable, and other like components. In these instances, the low power processor 422 can substantially in parallel with other tasks as described herein, in response to an image capture device power on event, initiate control and operational tasks related to the one or more accessories 460 such as, but not limited to, authentication, control signal hand shaking, and the like. In some implementations, a remaining set of tasks associated with the accessory or accessories can be performed during or after completion of a boot-up process or sequence of the processor 424.

The processing of the LEDS 442 can be performed in accordance with a state diagram 500 as shown in FIG. 5A and operational or functional flow 510 as shown in FIG. 5B.

The image capture device 400 may be used to implement some or all of the techniques described in this disclosure, such as the technique 500 described in FIG. 5A, the technique 510 described in FIG. 5B, the technique 600 described in FIG. 6, the technique 700 described in FIG. 7, the technique 1300 described in FIG. 13, and the technique 1400 described in FIG. 14.

Figure 5C:
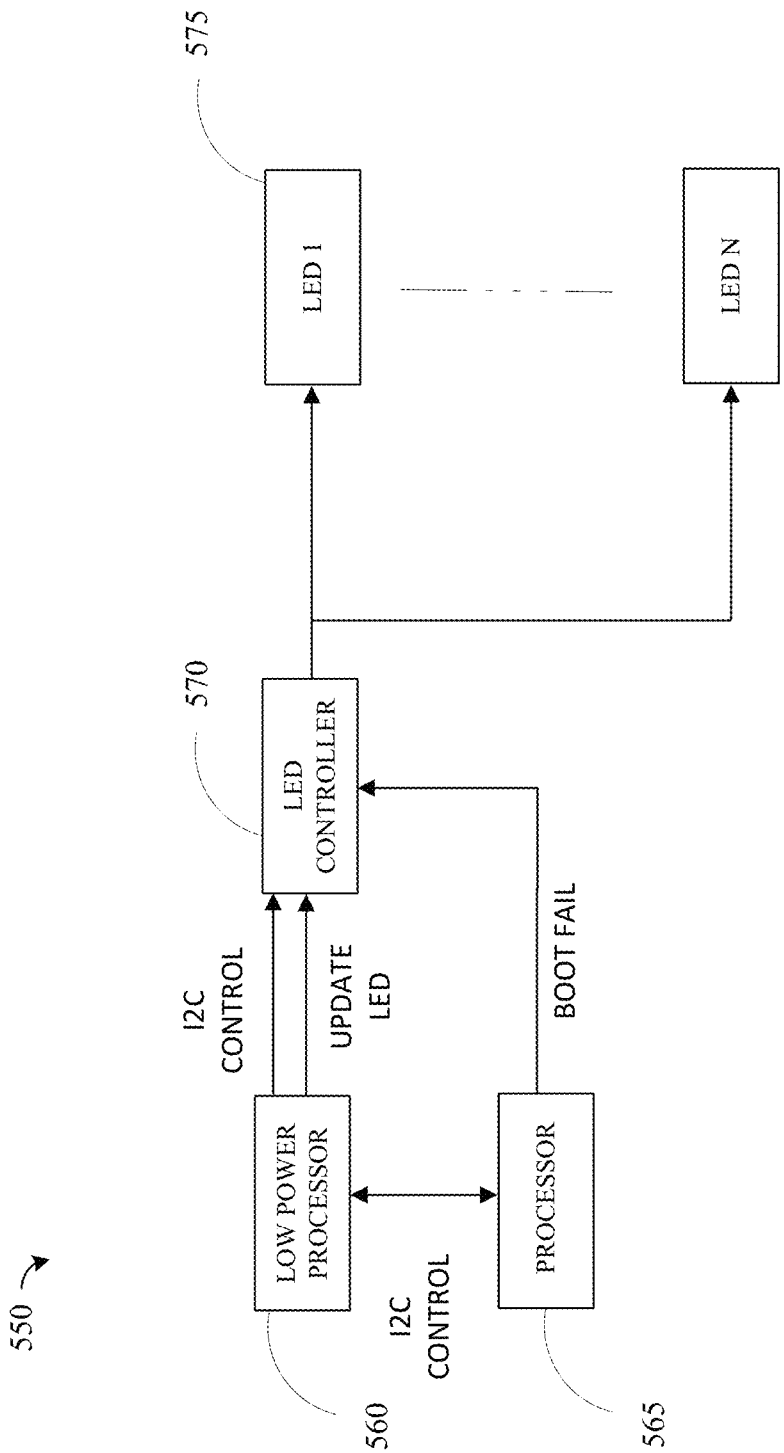
FIG. 5C is a block diagram of an image capture device with LED indicator control processing.

FIG. 5C is a block diagram of an image capture device 550 with LED indicator control. The image capture device 550 includes a low power processor 560, a processor 565, a LED controller, and LEDS 1, N 575. The low power processor 560 can control and provide updates to the LED controller 570 in accordance with the techniques described herein. The processor 565 can control the low power processor 560 and the LED controller 570 once the processor 565 is booted up. The LED controller can control the LEDS 1, N 575 based on the control and update information received from the low power processor 560, the processor 565, and combinations thereof.

The image capture device 500 may be used to implement some or all of the techniques described in this disclosure, such as the technique 500 described in FIG. 5A, the technique 510 described in FIG. 5B, the technique 600 described in FIG. 6, the technique 700 described in FIG. 7, the technique 1300 described in FIG. 13, and the technique 1400 described in FIG. 14.

FIG. 6 is a flow chart of a technique 600 to perform multiple boot processes. The technique 600 includes: detecting 610 an image capture device power on event; and substantially in parallel, initiating 620 a boot-up process for a first processor and starting 622 one or more indicator LEDS. For example, the technique 600 may be implemented by the image capture apparatus 100 shown in FIGS. 1A-1B, the image capture apparatus 200 shown in FIGS. 2A-2C, the image capture apparatus 300 shown in FIG. 3, the image capture apparatus 400 shown in FIG. 4, the image capture apparatus 550 shown in FIG. 5C, the image capture apparatus 1000 shown in FIG. 10, and the image capture apparatus 1100 shown in FIG. 11, as appropriate and applicable.

The technique 600 includes detecting 610 an image capture device power on event. An image capture device includes a first processor and a second processor. The second processor can be a low power processor. To alleviate or mitigate delays in the boot-up process, provide substantially immediate indication to a user, or combinations thereof, some control or operational tasks can be executed substantially parallel by the second processor upon detection of the image capture device power on event.

The technique 600 includes, substantially in parallel, initiating 620 a boot-up process for a first processor and starting 622 one or more indicator LEDS. The second processor can execute, substantially in parallel, the boot-up process for the first processor and power on the one or more indicator LEDS. In some implementations, an accessory can be attached prior to the image capture device power on event. In these instances, tasks related to the accessory can be executed by the second processor substantially in parallel with the other tasks.

FIG. 7 is another flow chart of a technique 700 to perform multiple boot processes. The technique 700 includes: detecting 710 an image capture device power on event; and substantially in parallel, initiating 720 a boot-up process for a first processor, starting 722 one or more indicator LEDS, and initiating 724 a battery authentication process. For example, the technique 700 may be implemented by the image capture apparatus 100 shown in FIGS. 1A-1B, the image capture apparatus 200 shown in FIGS. 2A-2C, the image capture apparatus 300 shown in FIG. 3, the image capture apparatus 400 shown in FIG. 4, the image capture apparatus 550 shown in FIG. 5C, the image capture apparatus 1000 shown in FIG. 10, and the image capture apparatus 1100 shown in FIG. 11, as appropriate and applicable.

The technique 700 includes detecting 710 an image capture device power on event. An image capture device includes a first processor and a second processor. The second processor can be, for example, a low power processor. To alleviate or mitigate delays in the boot-up process, provide substantially immediate indication to a user, or combinations thereof, some control or operational tasks can be executed substantially in parallel by the second processor upon detection of the image capture device power on event.

The technique 700 includes, substantially in parallel, initiating 720 a boot-up process for a first processor, starting 722 one or more indicator LEDS, and initiating 724 a battery authentication process. The second processor can execute, substantially in parallel, the boot-up process for the first processor, power on the one or more indicator LEDS, and authenticate the battery. In some implementations, an accessory can be attached prior to the image capture device power on event. In these instances, the tasks related to the accessory can be executed by the second processor in parallel with the other tasks.

Figure 8:
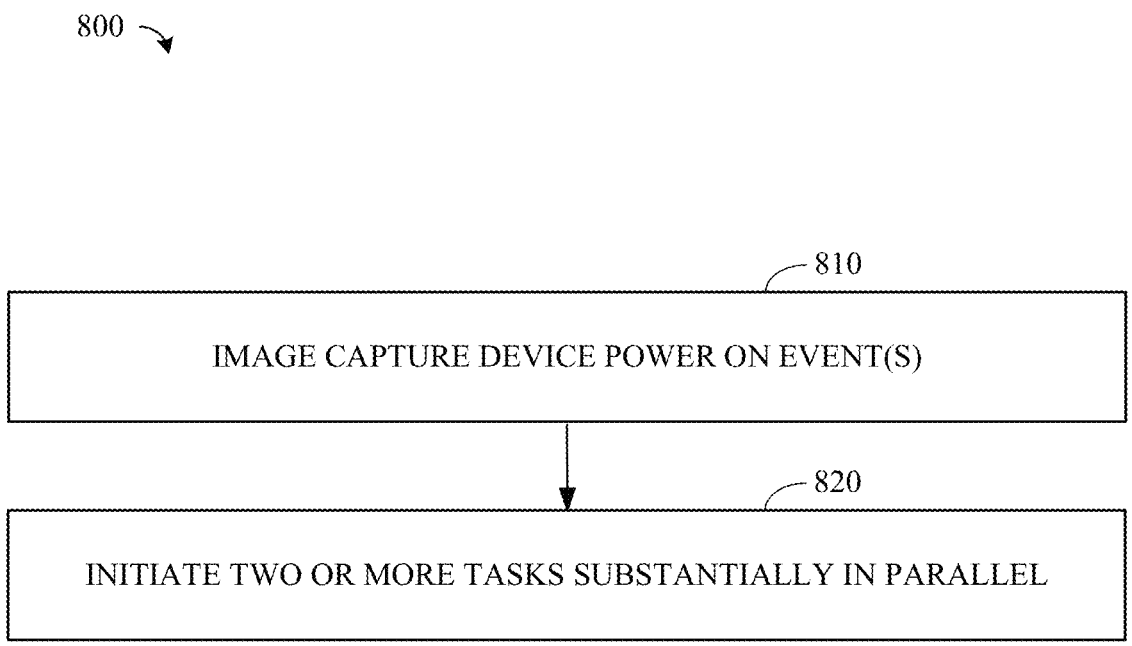
FIG. 8 is another flow chart of a technique to perform multiple boot processes.

FIG. 8 is yet another flow chart of a technique 800 to perform multiple boot processes. The technique 800 includes: detecting 810 at least one image capture device power on event; and substantially in parallel, initiating 820 two or more tasks associated with the at least one image capture device power on event. For example, the technique 800 may be implemented by the image capture apparatus 100 shown in FIGS. 1A-1B, the image capture apparatus 200 shown in FIGS. 2A-2C, the image capture apparatus 300 shown in FIG. 3, the image capture apparatus 400 shown in FIG. 4, the image capture apparatus 550 shown in FIG. 5C, the image capture apparatus 1000 shown in FIG. 10, and the image capture apparatus 1100 shown in FIG. 11, as appropriate and applicable.

The technique 800 includes detecting 810 at least one image capture device power on event. An image capture device includes a first processor and a second processor. The second processor can be, for example, a low power processor. To alleviate or mitigate delays in the boot-up process, provide substantially immediate indication to a user, or combinations thereof, some control or operational tasks can be executed substantially in parallel by the second processor upon detection of the at least one image capture device power on event.

The technique 800 includes initiating, substantially in parallel, 820 two or more tasks associated with the at least one image capture device power on event. The second processor can execute, substantially in parallel, a first task and at least one more task associated with the at least one image capture device power on event. For example, the tasks can include but are not limited, to boot-up process for the first processor, power on the one or more indicator LEDS, processing the memory card, and authenticating the battery. In some implementations, an accessory can be attached prior to the image capture device power on event. In these instances, the tasks related to the accessory can be executed by the second processor in parallel with the other tasks.

Figure 9:
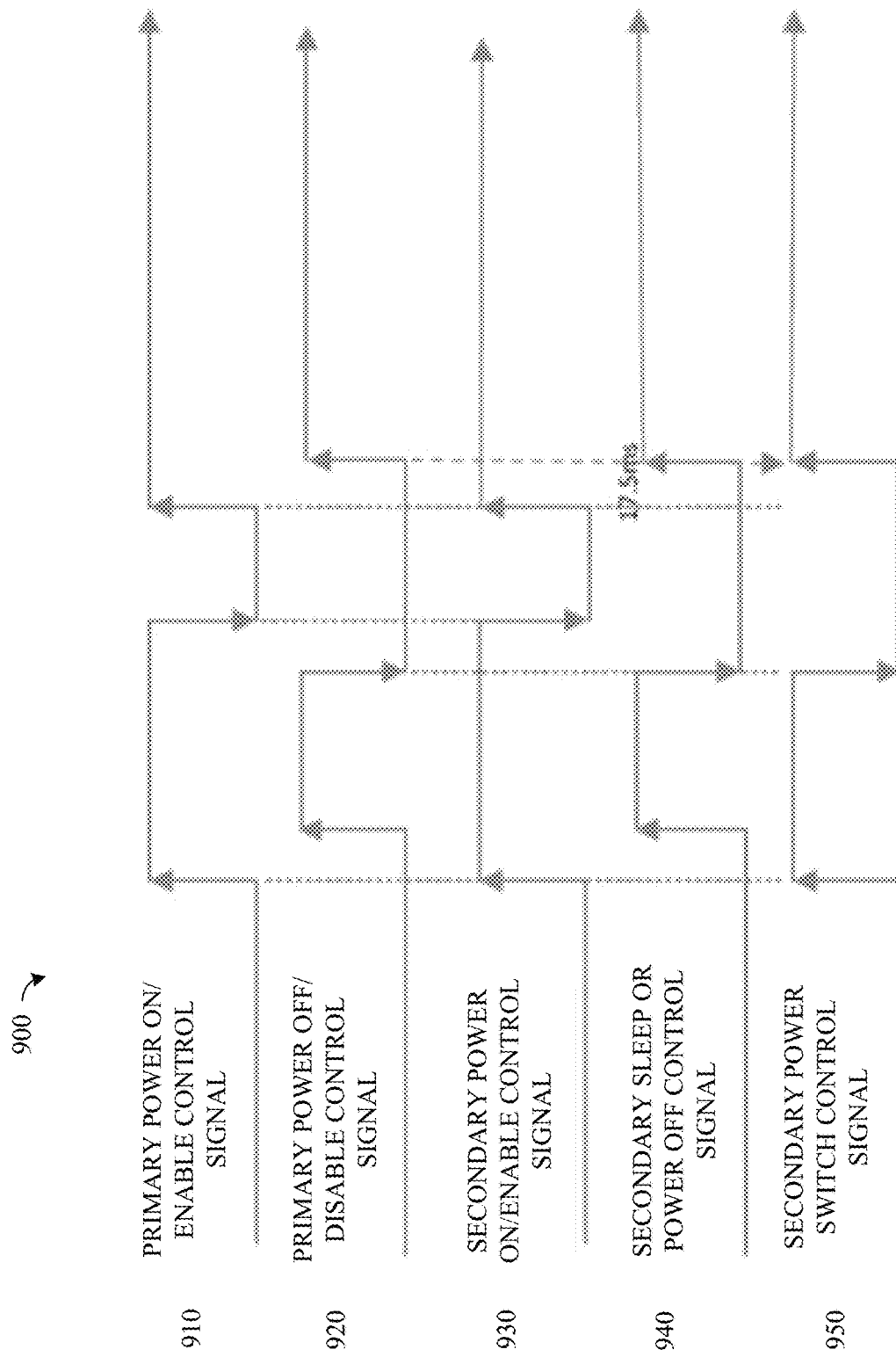
FIG. 9 is a timing diagram of incorrect power sequencing.

FIG. 9 is a timing diagram 900 of incorrect power sequencing. An image capture device can include power management components which can control a power on and power off sequencing of the image capture device. Incorrect or improper power sequence signaling can cause damage to the image capture device, delay powering on of the image capture device, place the image capture device in a frozen state, and other issues. The timing diagram 900 is an example of incorrect power sequence signaling between a primary power management component and a secondary power management component.

In response to an image capture device power on event, the primary power management component can provide a primary power on and/or enable control signal 910, which is a rising edge of first power on rail. A secondary power on and/or enable control signal 930 follows the primary power on and/or enable control signal 910, and a secondary power switch control signal 950 follows the secondary power on and/or enable control signal 930, resulting in power on sequencing the secondary power management component. The secondary power management component can then power on sequence a remaining components of the image capture device.

In response to an image capture device power off event, the primary power management component can provide a primary power off and/or disable control signal 920, which is a falling edge of the last power on rail. A secondary sleep or power off or disable control signal 940 follows the primary power off and/or disable control signal 920, and the secondary power switch control signal 950 follows the secondary sleep or power off or disable control signal 940, resulting in power off sequencing the secondary power management component. The secondary power management component can then power off sequence a remaining components of the image capture device.

In response to another image capture device power on event, the primary power management component can provide another primary power on and/or enable control signal 910. The secondary power on and/or enable control signal 930 follows the primary power on and/or enable control signal 910 as before. However, the secondary power switch control signal 950 is now tied to the secondary sleep or power off or disable control signal 940, which is still low because the primary power off and/or disable control signal 920 is still low. Consequently, the secondary power switch control signal 950 is not able to power on sequence the secondary power management component. Once the primary power off and/or disable control signal 920 goes high, then the secondary sleep or power off or disable control signal 940 goes high and the secondary power switch control signal 950 goes high. As shown, there is a delay in the power on sequencing due to the multiple primary control signals and their control of the corresponding secondary control signals.

Figure 10:
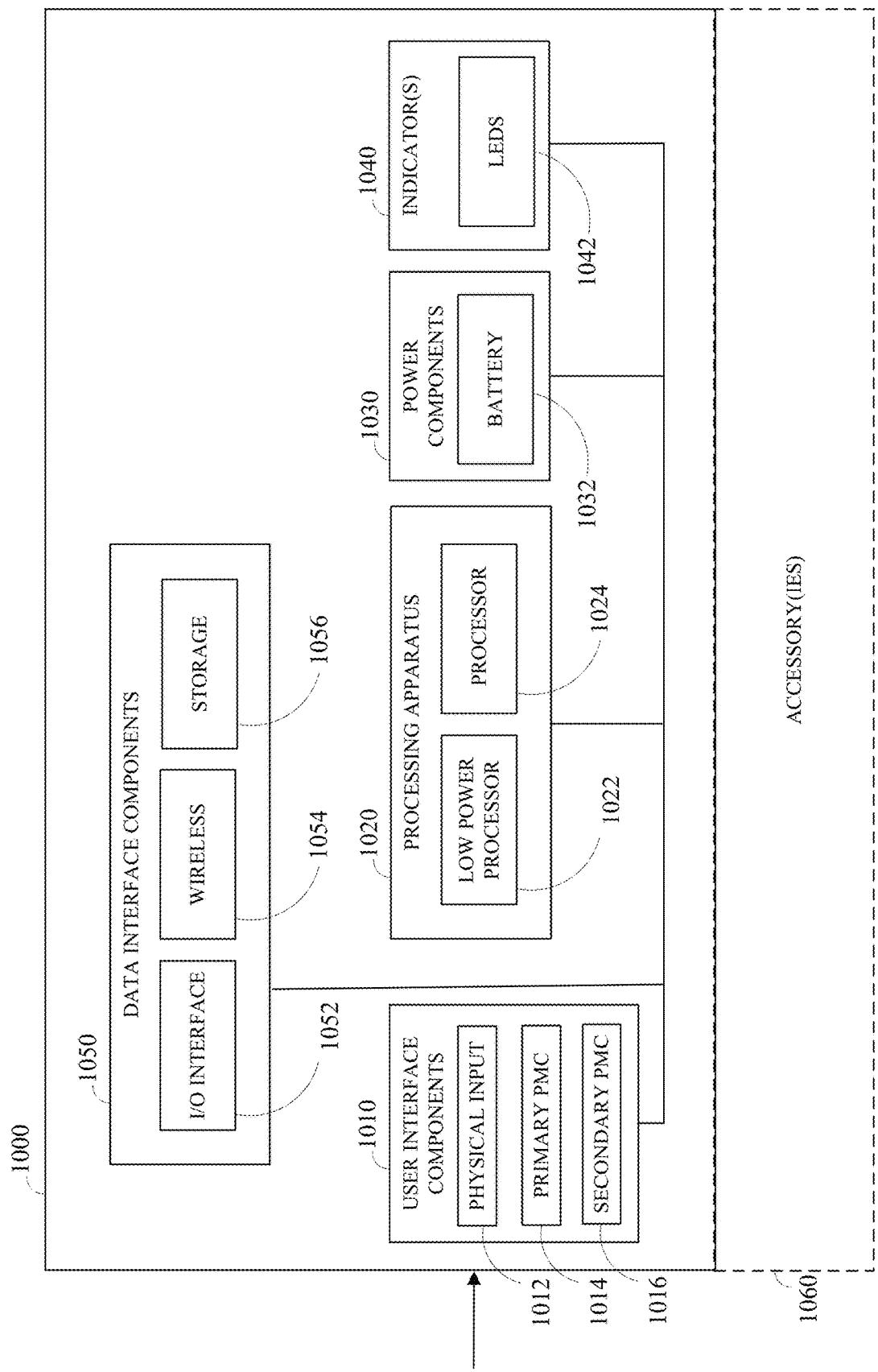
FIG. 10 is a block diagram of an image capture device.

FIG. 10 is a block diagram of an image capture device 1000. The image capture device 1000 can be a single-lens image capture device, a multi-lens image capture device, the image capture device 100 of FIG. 1A-B, the image capture device 200 of FIGS. 2A-D, the image capture device 300 of FIG. 3, or combinations thereof. The description of the image capture device 400 is also applicable to the image capture device 100 of FIG. 1A-B, the image capture device 200 of FIGS. 2A-D, the image capture device 300 of FIG. 3, and the image capture device 400 of FIG. 4.

The image capture device 1000 includes user interface components 1010, processing apparatus 1020, power components 1030, indicators 1040, and data interface components 1050. The user interface components 1010 include physical inputs 1012, a primary power management component 1014, and a secondary power management component 1016.

The physical inputs 1012 are for receiving input actions of a user such as powering on or powering off the image capture device 1000. For example, this can be done using a mode button, a shutter button, or like buttons or interfaces.

The primary power management component 1014 and the secondary power management component 1016 are responsive to the user input actions via the physical inputs 1012 and other image capture device power on or off events (collectively "image capture device power on or off events", "an image capture device power on event" or "an image capture device power off event", as appropriate). The primary power management component 1014 and the secondary power management component 1016 collectively control or provide power sequencing to other components in the image capture device 1000, such as but not limited to, the processing apparatus 1020. The primary power management component 1014 is for providing a primary power on control signal and/or a primary power off control signal based on image capture device power on or off events, as appropriate. The primary power management component 1014 controls the power sequencing of the secondary power management component 1016, which in turn controls the power sequencing of the other components in the image capture device 1000, such as but not limited to, the processing apparatus 1020.

The power components 1030 includes a battery 1032 configured to provide power for the image capture device 1000. The indicators 1040 include LEDS 1042 configured to convey information to the user such as, but not limited to, that the image capture device 1000 is powered on, is processing, or combinations thereof. The data interface components 1050 include, for example, I/O interfaces 1052, wireless interfaces 1054, and storage interfaces 1056 such as the I/O interface 332, the wireless data interface 334, and the storage interface 336.

The processing apparatus 1020 includes a processor 1024 configured to control and operate functionality of the image capture device 1000 and a low power processor 1022 configured to control and operate other functionality of the image capture device 1000 including, but not limited to, substantially performing tasks in parallel in response to an image capture device power on event. For example, the image capture device power on event can include, but is not limited to, a user initiated powering on of the image capture device 1000 via the user interface components 1010 and the physical inputs 1012, insertion of the battery 432 in the image capture device 1000, insertion of a memory card in the storage interfaces 1056, activation of the image capture device 1000 via a mobile application, activation of the image capture device 1000 via Bluetooth® using the wireless data interface 334, a programmed wake-up timer, cloud back-up initiated based on a charge level of the battery 1032, other like actions, or combinations thereof. The low power processor 1022 can perform, substantially in parallel, tasks associated the image capture device power on event, including but not limited to, initiating a boot-up process for the processor 1024, turning on the LEDS 1042, initiating a battery authentication process for the battery 1032 when the battery 1032 is inserted in the image capture device 1000, initiating memory card processing when a memory card is inserted in the image capture device 1000, initiating cloud backup processing (but not performing the cloud backup processing which is performed by the processor 1024, for example), wireless processing, and other low power processor 1022 control and operational tasks. In some implementations, a remaining set of tasks associated with the image capture device power on event can be performed during or after completion of a boot-up process or sequence of the processor 1024.

In some implementations, one or more accessories 1060 are releasably attached to the image capture device 1000 prior to the image capture device power on event. The one or more accessories 1060 can be, but is not limited to, an external adaptor for audio, a media accessory, a handheld adaptor for remote control of the image capture device 1000, a charging cable, and other like components. In these instances, the low power processor 1022 can substantially in parallel with other tasks as described herein, in response to an image capture device power on event, initiate control and operational tasks related to the one or more accessories 460 such as, but not limited to, authentication, control signal hand shaking, and the like. In some implementations, a remaining set of tasks associated with the accessory or accessories can be performed during or after completion of a boot-up process or sequence of the processor 1024.

The primary power management component 1014 and the secondary power management component 1016 collectively control or provide power sequencing to other components in the image capture device 1000, such as but not limited to, the processor 1024 and the low power processor 1022. The primary power management component 1014 controls the power sequencing of the secondary power management component 1016, which in turn controls the power sequencing of the other components in the image capture device 1000, such as but not limited to, the processor 1024 and the low power processor 1022. The processor 1024 and the low power processor 1022 then function and/or operate as described herein.

The image capture device 1000 may be used to implement some or all of the techniques described in this disclosure, such as the technique 500 described in FIG. 5A, the technique 510 described in FIG. 5B, the technique 600 described in FIG. 6, the technique 700 described in FIG. 7, the technique 1300 described in FIG. 13, and the technique 1400 described in FIG. 14.

Figure 11:
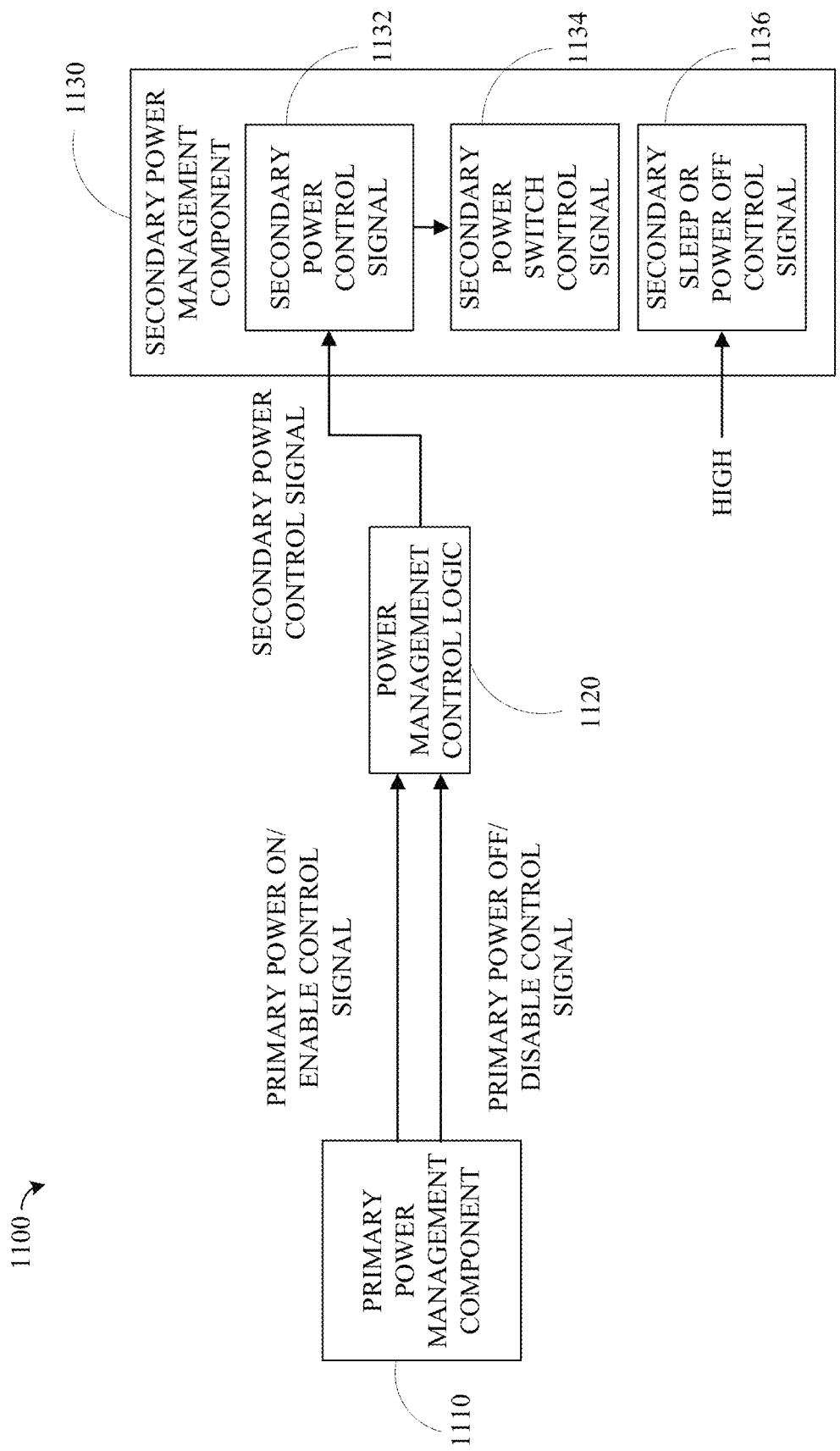
FIG. 11 is a block diagram of power management components and circuitry.
Figure 12:
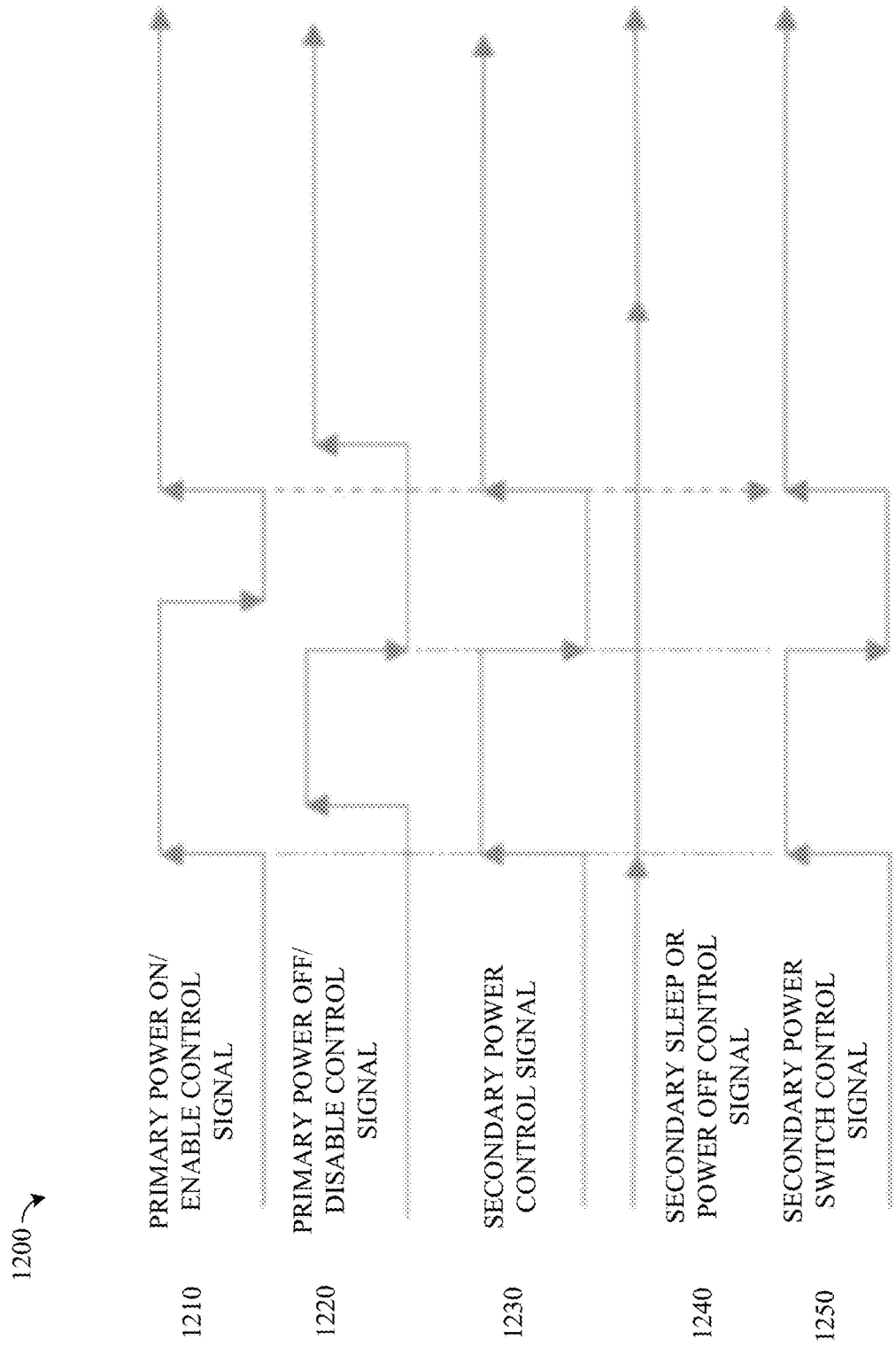
FIG. 12 is a timing diagram of power sequencing.

FIG. 11 is a block diagram of an image capture device 1100 with power management components and circuitry for power sequencing and FIG. 12 is a timing diagram 1200 of power sequencing. The image capture device 1100 includes a primary power management component 1110, a power management control logic 1120, and a secondary power management component 1130. The secondary power management component 1130 includes a secondary power control signal input or pin 1132, a secondary power switch control signal input or pin 1134, and a secondary sleep or power off control signal input or pin 1136. In some implementations, the secondary power control signal input or pin 1132 is an input or pin associated with the secondary power on and/or enable control signal of FIG. 9.

The power sequencing issues described with respect to FIG. 9 are corrected or overcome by using the power management control logic 1120 to provide one secondary power control signal 1230 to the secondary power control signal input or pin 1132, where the one secondary power control signal 1230 is based on a primary power on and/or enable control signal 1210 or a primary power off and/or disable control signal 1220, and by tying the secondary sleep or power off control signal input or pin 1136 to high, as shown in FIG. 12 as secondary sleep or power off control signal 1240.

In response to an image capture device power on event, the primary power management component 1110 can provide a primary power on and/or enable control signal 1210, which is a rising edge of first power on rail. The power management control logic 1120 processes the primary power on and/or enable control signal 1210 and outputs the secondary power control signal 1230 to the secondary power control signal input or pin 1132. A secondary power switch control signal 1250 follows the secondary power control signal 1230, resulting in power on sequencing the secondary power management component 1130. The secondary power management component 1130 can then power on sequence a remaining components of the image capture device 1100.

In response to an image capture device power off event, the primary power management component 1110 can provide a primary power off and/or disable control signal 1220, which is a falling edge of the last power on rail. The power management control logic 1120 processes the primary power off and/or disable control signal 1220 and outputs the secondary power control signal 1230 to the secondary power control signal input or pin 1132. The secondary power switch control signal 1250 follows the secondary power control signal 1230, resulting in power off sequencing the secondary power management component 1130. The secondary power management component 1130 can then power off sequence a remaining components of the image capture device 1100.

In response to future image capture device power on and/or off events, the power sequencing between the primary power management component 1110 and the secondary power management component 1130 remain in near synchronization or are substantially synchronized. The secondary power control signal 1230 follows each applicable edge of the primary power on and/or enable control signal 1210 and the primary power off and/or disable control signal 1220.

The image capture device 1100 may be used to implement some or all of the techniques described in this disclosure, such as the technique 500 described in FIG. 5A, the technique 510 described in FIG. 5B, the technique 600 described in FIG. 6, the technique 700 described in FIG. 7, the technique 1300 described in FIG. 13, and the technique 1400 described in FIG. 14.

FIG. 13 is a flow chart of a technique 1300 to perform power sequencing. The technique 1300 includes: tying 1310 a secondary sleep and/or disable input to a logic level; processing 1320 a primary power on signal or a primary power off signal to generate a secondary power control signal; and outputting 1330 the secondary power control signal to a secondary power on control input. For example, the technique 1300 may be implemented by the image capture apparatus 100 shown in FIGS. 1A-1B, the image capture apparatus 200 shown in FIGS. 2A-2C, the image capture apparatus 300 shown in FIG. 3, the image capture apparatus 400 shown in FIG. 4, the image capture apparatus 550 shown in FIG. 5C, the image capture apparatus 1000 shown in FIG. 10, and the image capture apparatus 1100 shown in FIG. 11, as appropriate and applicable.

The technique 1300 includes tying 1310 a secondary sleep and/or disable input to a logic level. Power management components are used by image capture devices to provide power sequencing upon receipt of image capture device power on and/or off events. In some implementations, the image capture device can include a primary power management component and a secondary power management component. The primary power management component controls power sequencing of the secondary power management component, which in turn controls power sequencing of the remaining components in the image capture device. For purposes of control, the secondary power management component includes a secondary power on control pin for enabling power on and a secondary power off or sleep pin. The secondary power off or sleep pin is tied to a defined logic level to nullify operational impact on power sequencing.

The technique 1300 includes processing 1320 a primary power on signal or a primary power off signal to generate a secondary power control signal. Image capture device power on and/or off events result in the primary power management component generating a primary power on control signal or a primary power off control signal, respectively. A power management control logic or circuit processes the primary power on control signal or the primary power off control signal in accordance with the type of control signal. The power management control logic or circuit generates the appropriate secondary power control signal.

The technique 1300 includes outputting 1330 the secondary power control signal to a secondary power on control input. The power management control logic or circuit is connected to the secondary power on control input. That is, the secondary power on control input handles or controls power sequencing of the secondary power management component. The secondary power management component processes the secondary power control signal and power sequences (on or off) the other components of the image capture device.

FIG. 14 is a flow chart of a technique 1400 to perform powering on and off of an image capture device. The technique 1400 includes: detecting 1410 one of an image capture device power on or off event; generating 1420 a primary power on control signal or a primary power off control signal; processing 1430 the primary power on control signal or the primary power off control signal to generate a secondary power control signal; outputting 1440 the secondary power control signal to a secondary power on control input; and substantially in parallel, initiating 1450 two or more tasks associated with detection of an image capture device power on event. For example, the technique 1400 may be implemented by the image capture apparatus 100 shown in FIGS. 1A-1B, the image capture apparatus 200 shown in FIGS. 2A-2C, the image capture apparatus 300 shown in FIG. 3, the image capture apparatus 400 shown in FIG. 4, the image capture apparatus 550 shown in FIG. 5C, the image capture apparatus 1000 shown in FIG. 10, and the image capture apparatus 1100 shown in FIG. 11, as appropriate and applicable.

The technique 1400 includes detecting 1410 one of an image capture device power on or off event and generating 1420 a primary power on control signal or a primary power off control signal. Power management components are used by image capture devices to provide power sequencing upon receipt of image capture device power on and/or off events. In some implementations, the image capture device can include a primary power management component and a secondary power management component. The primary power management component controls power sequencing of the secondary power management component, which in turn controls power sequencing of the remaining components in the image capture device such as for example, a first processor and a second processor, where the second processor can be, for example, a low power processor. For purposes of control, the secondary power management component includes a secondary power on control pin for enabling power on and a secondary power off or sleep pin. The secondary power off or sleep pin is tied to a defined logic level to nullify operational impact on power sequencing.

The technique 1400 includes processing 1430 the primary power on control signal or the primary power off control signal to generate a secondary power control signal and outputting 1440 the secondary power control signal to a secondary power on control input; and substantially in parallel. A power management control logic or circuit processes the primary power on control signal or the primary power off control signal in accordance with the type of control signal. The power management control logic or circuit generates the appropriate secondary power control signal. The power management control logic or circuit is connected to the secondary power on control input. That is, the secondary power on control input handles or controls power sequencing of the secondary power management component. The secondary power management component processes the secondary power control signal and power sequences (on or off) the other components of the image capture device.

The technique 1400 includes initiating 1450 two or more tasks associated with detection of an image capture device power on event. To alleviate or mitigate delays in the boot-up process, provide substantially immediate indication to a user, or combinations thereof, some control or operational tasks can be executed substantially in parallel by the second processor upon detection of the at least one image capture device power on event. The second processor can execute, substantially in parallel, a first task and at least one more task associated with the at least one image capture device power on event. For example, the tasks can include but are not limited, to boot-up process for the first processor, power on the one or more indicator LEDS, processing the memory card, and authenticating the battery. In some implementations, an accessory can be attached prior to the image capture device power on event. In these instances, the tasks related to the accessory can be executed by the second processor in parallel with the other tasks.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    detecting, by a low power processor in an image capture device, an image capture device power on event; and
    substantially in parallel:
        initiating, by the low power processor, a boot-up process for a processor in the image capture device; and
        starting, by the low power processor, one or more indicator LEDS in the image capture device,
    wherein the term substantially indicates that start times for enumerated elements are near or almost identical.

2. The method of claim 1, further comprising:
    substantially in parallel:
        initiating, by the low power processor, authentication of a battery inserted in the image capture device.

3. The method of claim 1, further comprising:
    substantially in parallel:
    initiating, by the low power processor, control and operational tasks related to one or more accessories releasably attached to the image capture device prior to the image capture device power on event.

4. The method of claim 1, wherein the image capture device power on event is a user initiated image capture device power on event.

5. The method of claim 1, wherein the image capture device power on event is a battery insertion event.

6. The method of claim 1, further comprising:
    generating, by a primary power management component, a primary power on control signal;
    generating, by a power management control, a secondary power control signal based on the primary power on control signal;
    initiating, by a secondary power management component, a power on sequencing based on receiving the secondary power control signal at a secondary power on control signal input; and
    initiating, by the low power processor, power sequencing based on control signal received from the secondary power management component.

7. The method of claim 1, further comprising:
    generating, by the primary power management component, a primary power off control signal in response to an image capture device power off event;
    generating, by the power management control, a secondary power control signal based on the primary power off control signal; and
    initiating, by the secondary power management component, a power off sequencing based on receiving the secondary power control signal based on the primary power off control signal at the secondary power on control signal input, wherein a secondary sleep control signal input is tied to a defined logic level.

8. A method, comprising:
    detecting, by a low power processor in an image capture device, at least one image capture device power on event; and
    substantially in parallel:
        initiating, by the low power processor, a first task associated with the at least one image capture device power on event; and
        starting, by the low power processor, at least another task associated with the at least one image capture device power on event,
    wherein the term substantially indicates that start times for enumerated elements are near or almost identical.

9. The method of claim 8, wherein the first task is starting a boot-up process for a processor in the image capture device.

10. The method of claim 9, wherein the at least another task is starting one or more indicator LEDS.

11. The method of claim 9, wherein a task of the at least another task is starting one or more indicator LEDS and another task is initiating control and operational tasks related to one or more accessories releasably attached to the image capture device prior to the image capture device power on event.

12. The method of claim 8, wherein the image capture device power on event is a user initiated image capture device power on event.

13. The method of claim 8, wherein the image capture device power on event is a battery insertion event.

14. An image capture device, comprising:
- a primary power management component configured to generate a primary power on control signal in response to an image capture device power on event and generate a primary power off control signal in response to an image capture device power off event;
- a power management control logic configured to process the primary power on control signal or the primary power off control signal to generate a secondary power control signal; and
- a secondary power management component configured to power on sequence or power off sequence based on receiving the secondary power control signal at a secondary power on control signal input, wherein a secondary sleep control signal input is tied to a defined logic level.

15. The image capture device of claim 14, further comprising:
- a low power processor, upon detection of the image capture device power on event, configured to:
substantially in parallel:
  - initiate a first task associated with the image capture device power on event; and
  - start at least another task associated with the image capture device power on event,
wherein the term substantially indicates that start times for enumerated elements are near or almost identical.

16. The image capture device of claim 15, further comprising:
- a processor, wherein the first task is to start a boot-up process for the processor.

17. The image capture device of claim 15, wherein the at least another task is to start one or more indicator LEDS.

18. The image capture device of claim 15, wherein a task of the at least another task is to start one or more indicator LEDS and another task is to initiate control and operational tasks related to one or more accessories releasably attached to the image capture device prior to the image capture device power on event.

19. The image capture device of claim 14, wherein the image capture device power on event is a user initiated image capture device power on event.

20. The image capture device of claim 14, wherein the image capture device power on event is a battery insertion event.

* * * * *